United States Patent

Yoon et al.

(10) Patent No.: US 8,376,402 B2
(45) Date of Patent: Feb. 19, 2013

(54) LOWER TYPE MOTOR DRIVEN COLUMN APPARATUS

(75) Inventors: Sanggyu Yoon, Seoul (KR); Seounghoon Lee, Suwon-si (KR); Donghan Lee, Yongin-si (KR); Sungjong Hong, Seoul (KR); Sangchul Ku, Seoul (KR); Munchun Park, Daegu (KR)

(73) Assignees: Hyundai Motor Company, Seoul (KR); Kia Motors Corporation, Seoul (KR); Namyang Ind. Co., Ltd., Ansan-Shi (KR)

( * ) Notice: Subject to any disclaimer, the term of this patent is extended or adjusted under 35 U.S.C. 154(b) by 143 days.

(21) Appl. No.: 12/966,691

(22) Filed: Dec. 13, 2010

(65) Prior Publication Data

US 2011/0162904 A1 Jul. 7, 2011

(30) Foreign Application Priority Data

Jan. 7, 2010 (KR) .......................... 10-2010-0001102
Sep. 29, 2010 (KR) .......................... 10-2010-0094796

(51) Int. Cl.
*B62D 1/18* (2006.01)
(52) U.S. Cl. ...................................... 280/775
(58) Field of Classification Search .................. 280/775, 280/777, 779; 74/492, 493
See application file for complete search history.

(56) References Cited

U.S. PATENT DOCUMENTS

| | | | |
|---|---|---|---|
| 4,967,618 A * | 11/1990 | Matsumoto et al. | ............. 74/493 |
| 7,331,608 B2 * | 2/2008 | Armstrong et al. | ............ 280/775 |
| 7,587,959 B2 * | 9/2009 | Ridgway et al. | ................ 74/493 |
| 7,665,767 B2 * | 2/2010 | Olgren et al. | ................. 280/777 |
| 2004/0023746 A1 | 2/2004 | Arihara | |
| 2005/0275206 A1 * | 12/2005 | Gerlind | .......................... 280/775 |

FOREIGN PATENT DOCUMENTS

| | | |
|---|---|---|
| JP | 63-265766 A | 11/1988 |
| JP | 2004-58927 A | 2/2004 |
| JP | 2006-327374 A | 12/2006 |
| JP | 2008-143441 A | 6/2008 |
| KP | 10-2005-0018143 A | 2/2005 |
| KR | 10-2005-0018142 A | 2/2005 |

* cited by examiner

*Primary Examiner* — Faye M. Fleming
(74) *Attorney, Agent, or Firm* — Morgan, Lewis & Bockius LLP (57) ABSTRACT

A lower type motor-driven column apparatus includes a tilt unit having a column tube and a tilt link forming a plurality of hinge fixed points in order to tilt up/down a steering wheel by vertical motion generated with rotation due to straight motion of a tilt rod through a tilt motor, a telescopic unit implementing telescopic movement pushing or pulling the column tube by means of straight motion of a tele-rod through a tele-motor, and a shock-absorbing member absorbing and attenuating a shock stroke of the column tube, ahead of the tilt unit and the telescopic unit, in which the operation mechanism of the tilt unit and the operation mechanism of the telescopic unit are individually implemented, such that the MDPS can be easily used for middle-sized and large-sized vehicles which are difficult to use the upper type and it is possible to save fuel of the middle-sized and large-sized vehicles.

12 Claims, 8 Drawing Sheets

FIG.6

LOWER TYPE MOTOR DRIVEN COLUMN APPARATUS

CROSS-REFERENCE TO RELATED APPLICATIONS

The present application claims priority to Korean Patent Application Numbers 10-2010-0001102 and 10-2010-0094796 filed Jan. 7, 2010 and Sep. 29, 2010, respectively, the entire contents of which are incorporated herein for all purposes by this reference.

BACKGROUND OF THE INVENTION

1. Field of the Invention

The present invention relates to a motor-driven column apparatus, and more particularly, to a lower type motor-driven column apparatus that allows an MDPS (Motor Driven Power Steering) to be used in middle and large vehicles.

2. Description of Related Art

In general, MDPS (Motor Driven Power Steering) that is a motor-driven steering device assisting steering power by using power from a motor without using hydraulic pressure is commonly used in small-sized vehicles.

The MDPS is equipped with a decelerator composed of a worm-shaft/worm wheel rotated by a motor to assist steering force and a motor-driven column apparatus having a tilt/telescopic structure to implement and tilt and telescopic performance.

The motor-driven column apparatus simultaneously operates a tilt mechanism in telescopic transmission, such that load to the motor is increased, and the motor-driven column apparatus having the tilt/telescopic operation mechanism is called an upper type motor-driven column apparatus.

As described above, the load exerted in the motor is necessarily increased by the operation mechanism in the upper type motor-driven column apparatus, such that load operation noise is generated.

Not only small-sized vehicle, middle-sized and large-sized vehicles have been necessarily equipped with the MDPS due to the importance of reducing fuel in the vehicles.

However, the motor-driven column apparatus used with the MDPS is the upper type designed for small-sized vehicles, as described above, and there is a structural limit in using the MDPS with the upper type motor-driven column apparatus itself for large-sized vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to provide a lower type motor-driven column apparatus that can achieve equivalent or improved operation and collision performance implemented by upper type motor-driven column apparatuses while reducing motor load and operation noise, by individually implementing the operations of a telescopic mechanism and a tilt mechanism.

One aspect of the present invention provides a lower type motor-driven column apparatus, which includes a tilt unit mounted in a column tube to implement tilting-up and tilting-down motion of the column tube covering a steering shaft and hinged to a car body-fastening mounting bracket, a telescopic unit mounted on the column tube without interfering with the tilt unit in order not to move together with the tilt unit, when implementing telescopic movement pushing or pulling the column tube, and a shock-absorbing member combined with the column tube, stops the column tube axially pushed by using friction force, and absorbing shock.

The tilt unit may include a tilt rod combined with a tilt motor hinged to the car body-fastening mounting bracket, and a tilt link which has a lower end connected to the tilt rod and an upper end hinged to the column tube to apply force to the column tube by means of straight motion of the tilt rod, and the telescopic unit includes a tele-rod combined with a tele-motor, and a tele-bracket connected to the tele-rod moving straight to implement telescopic movement pulling or pushing the column tube.

A worm shaft and a worm gear which convert rotation of the motor into straight motion may be disposed in the tilt motor and the tele-motor.

The tilt motor may be disposed to make a straight line with the tilt rod, the tele-motor is disposed perpendicular to the tele-rod, and the tilt rod and the tele-rod may be arranged in parallel with the axis of the column tube.

The lower end of the tilt link may be connected with the tilt rod by one hinge connecting portion and the upper end of the tilt link may be connected with the column tube by two hinge connecting portions positioned in the same line as hinge center points of the column tube and the mounting bracket.

The two hinge connecting portions may be formed higher than the mounting bracket rod.

The tilt link may include a link bracket forming the lower end and the upper end, a tilt rod pin making the hinge connecting portion of the lower end, a pair of left and right tilt bolts making the hinge connecting portions of the upper end, and a tube housing combined with the left and right tilt bolts to form a gap for sliding, and sliding while covering the column tube.

A bush may be provided where the left and right tilt bolts are combined with the column tube.

A mounting boss having an oblong groove forming empty spaces at the left and right sides from the center axis line of the left and right tilt bolts may be formed in the tube housing.

The shock-absorbing member may be formed in a tube ring type to cover the column tube and combined with the column tube inside where the tele-bracket is made tele-in.

According to various aspects of the present invention, the motor-driven column apparatus may be implemented in a lower type which individually operates the telescopic mechanism and the tilt mechanism, such that MDPS can be easily used for middle-sized and large-sized vehicles to save fuel.

Further, the lower type motor-driven column apparatus of the present invention can improve operation and shock performance implemented by an upper type motor-driven column apparatus while reducing motor load and operation noise.

Further, the lower type motor-driven column apparatus of the present invention can reduce the entire length, weight, and manufacturing cost by optimizing the tilting path, using a multi-link.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
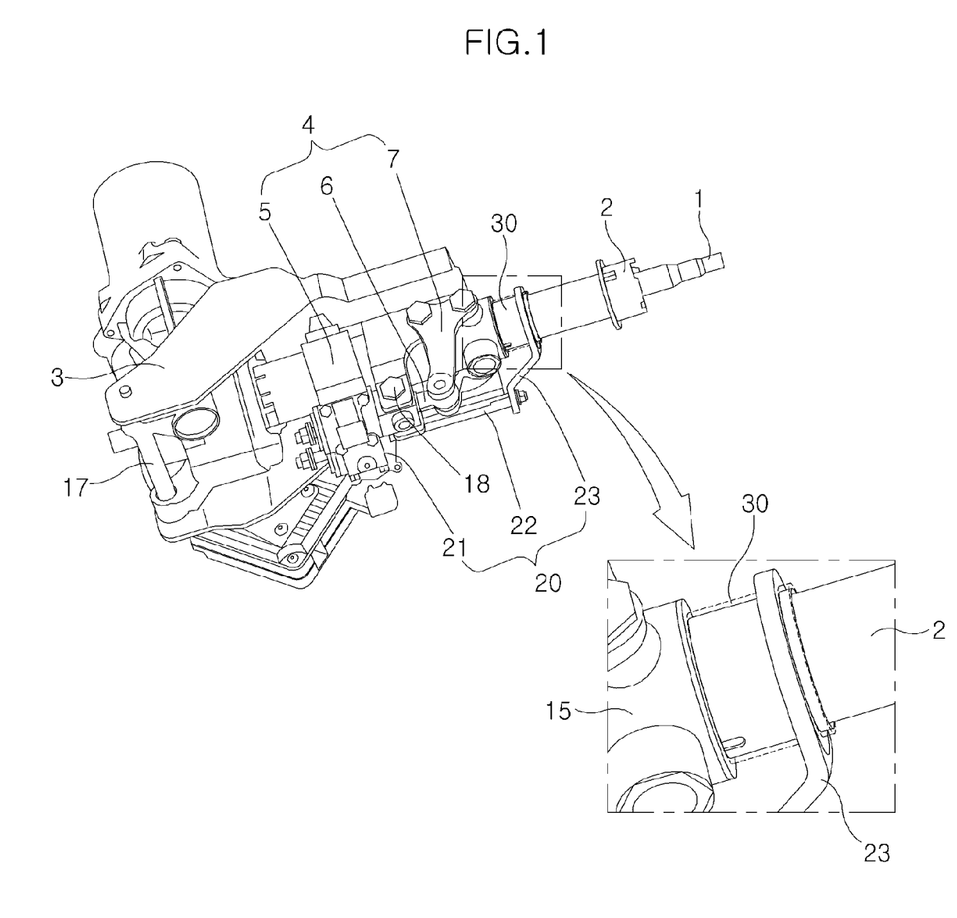
FIG. 1 is a view showing the configuration of an exemplary lower type motor-driven column apparatus according to the present invention.

Referring to FIG. 1, the lower type motor-driven column apparatus includes a column tube 2 combined with a mounting bracket 3 and covering a steering shaft 1, a tilt unit 4 implementing tilt motion tilting up/down column tube 2 in tilting, a telescopic unit 20 supported by mounting bracket 3 without interfering with the motion of tilt unit 4 and implementing telescopic motion by moving telescopically column tube 2, and a shock-absorbing member 30 absorbing shock applied to a steering wheel.

In the exemplary embodiment, a column tube hinge portion 3a that is the reference point of the tilting-up/down motion of column tube 2 is disposed at one end of mounting bracket 3 and a tilt motor hinge portion 3b supporting tilt unit 4 is disposed at the other end.

A mounting bracket rod 17 is fastened to column tube hinge portion 3a to be fixed with column tube 2 at the space inside, a mounting bracket pin 18 is disposed through tilt motor hinge portion 3b to be fixed with tilt unit 4 at the space inside.

Column tube 2 can tilt up/down because mounting bracket rod 17 functions as a hinge shaft and the displacement due to operation of tilt unit 4 can be absorbed because mounting bracket pin 18 functions as a hinge shaft.

Figure 2:
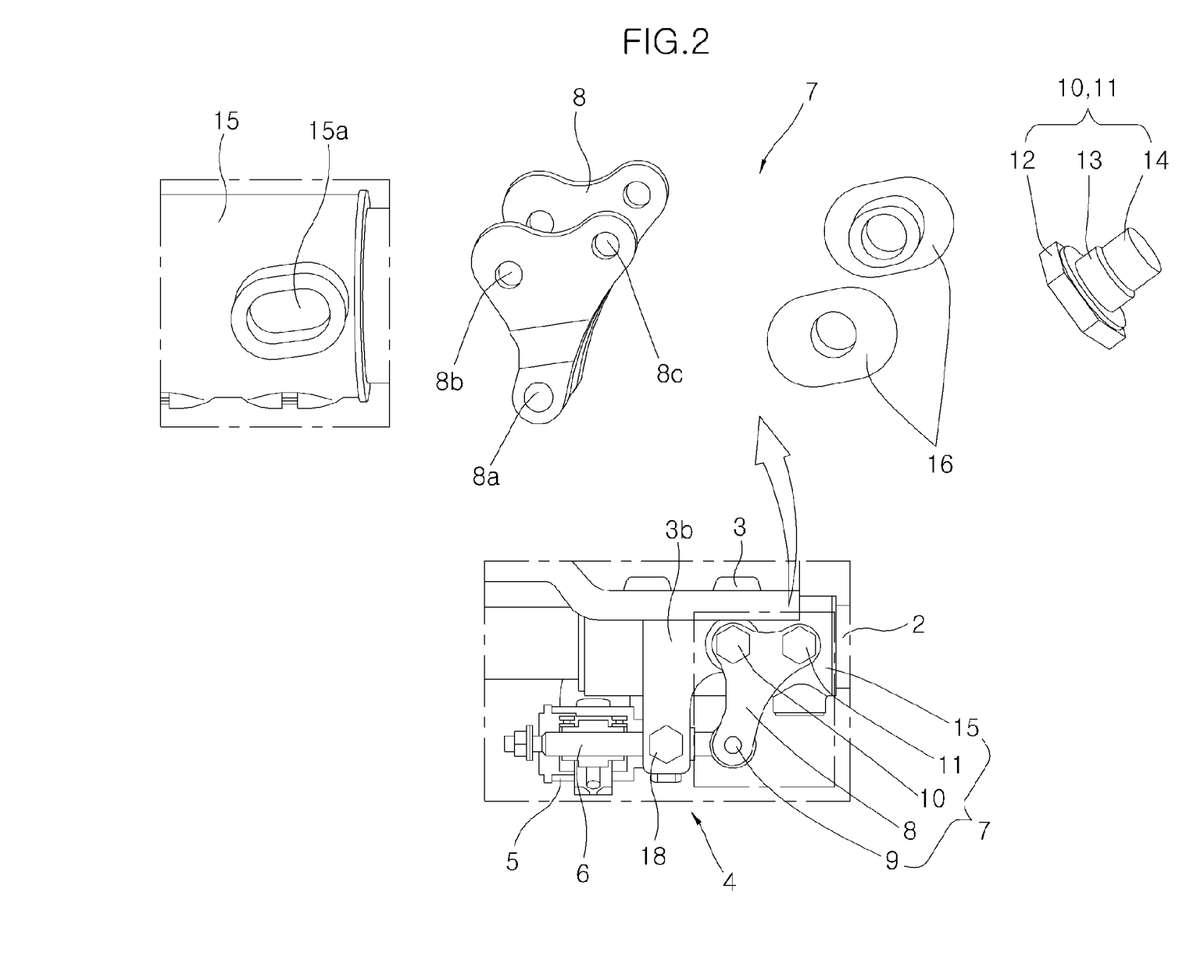
FIG. 2 is a view showing the parts of an exemplary tilt unit according to the present invention.

Referring to FIG. 2, tilt unit 4 is composed of a tilt motor 5 having built-in worm shaft and worm gear and supported against mounting bracket 3 by a housing, a tilt rod 6 moving straight forward/backward by the worm shaft and worm gear of tilt motor 5, and a tilt link 7 converting the straight motion of tilt rod 6 into the tilting-up/down motion of column tube 2, using the hinge fixed point.

Tilt motor 5 and tilt rod 65 are arranged in the axial direction of column tube 2.

Tilt link 7 is composed of a pair of link brackets 8 having a lower end that is a connection fixed point connected with tilt rod 6 and upper ends that are hinge fixed points at both sides of a tube housing 15 covering column tube 2, a tilt rod pin 9 fixing tilt rod 6 and a link bracket 8 to form the connection fixed point, and a tilt bolt screwed in tube housing 15 through link bracket 8 to form the hinge fixed points.

The connection fixed point of link bracket 8 is formed at one position, while the hinge fixed points are formed in a pair spaced apart from each other.

For this configuration, link bracket 8 has one lower hinge hole 8a that is the connecting fixed point, and an upper left hinge hole 8b and an upper right hinge hole 8c that are the hinge fixed points.

The tilt bolt is composed of a left tilt bolt 10 inserted in upper left hinge hole 8b of link bracket 8 and a right tilt bolt 11 inserted in upper right hinge hole 8c of link bracket 8, and the pair of left and right tilt bolts 10, 11 has the same structure composed of a hexagonal head 12, a screw shaft 13 having a thread on the outer circumference, and an extender 14 without a thread.

Tube housing 15 is a hollow member to accommodate column tube 2, protruding mounting bosses 15a having an oblong groove at both side of the outer circumference are formed in the same number as left and right tilt bolts 10, 11.

Left and right tilt bolts 10, 11 functioning as the hinge fixed points are screwed in mounting bosses 15a.

Figure 3:
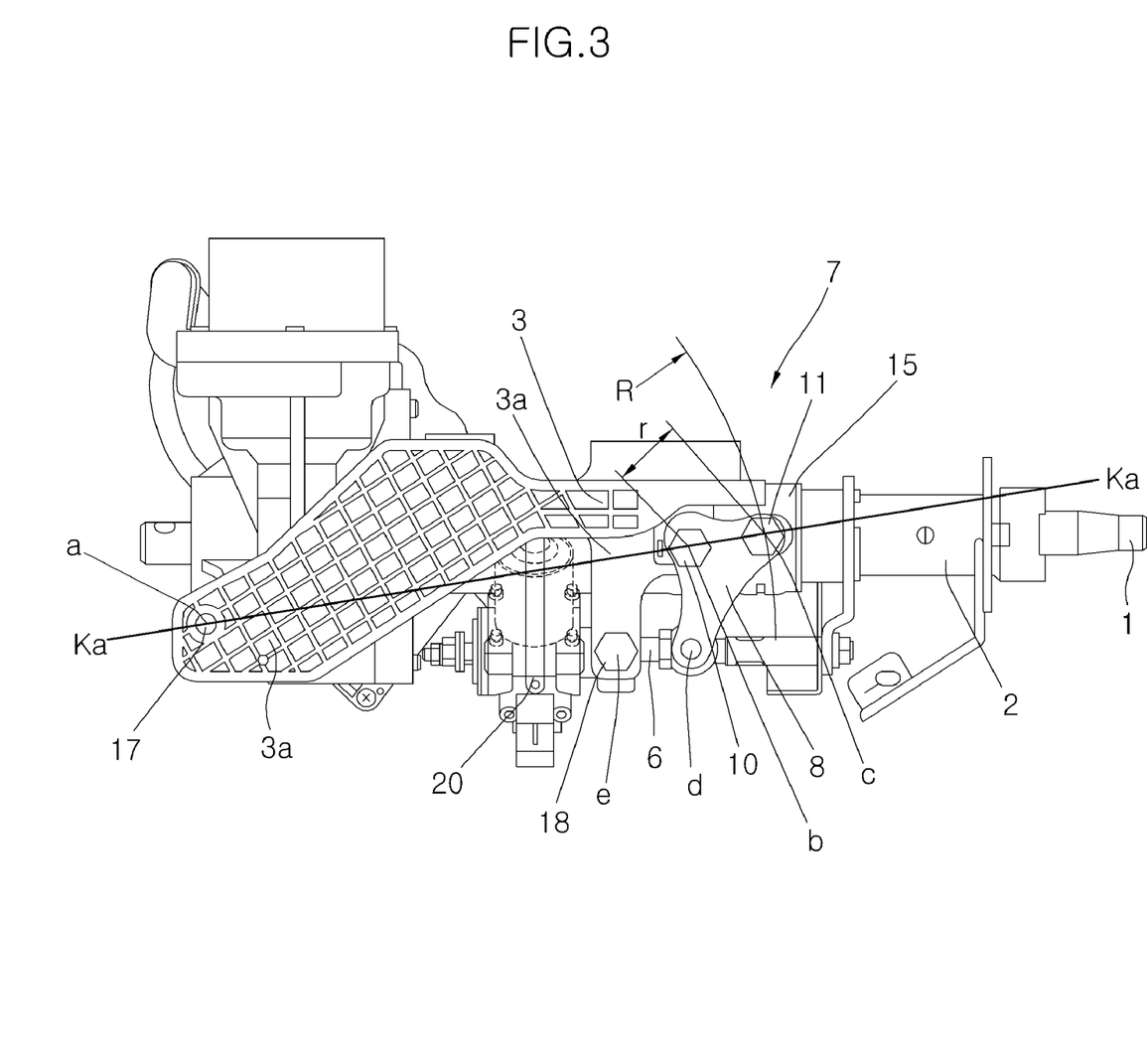
FIGS. 3 and 4 are views showing tilt locus path and tilt locus compensation of an exemplary tilt mechanism according to the present invention.

Referring to FIG. 3, since tilt unit 4 has s hinge link structure implementing tilt motion by tilting-up/down about mounting bracket 3, which is the hinge fixed point, with rotation using column tube 2, the hinge link structure reduces changes in tilt motion distance of tilt unit 4, such that the entire length of tilt unit 4 for the tilt motion can be reduced.

The tilt motion locus is implemented by using mounting bracket rod 17 as a first hinge fixed point 'a', left tilt bolt 10 as a second hinge fixed point 'b', right tilt bolt 11 as a third hinge fixed point 'c', tilt rod pin 9 as a fourth hinge fixed point 'd', and mounting bracket 18 as a fifth hinge fixed point 'e'.

First hinge fixed point 'a', second hinge fixed point 'b', and third hinge fixed point 'c' are arranged in the same straight line Ka-Ka and third hinge fixed point 'c' rotated about second hinge fixed point 'b', such that the operational radius R of third hinge fixed point 'c' about first hinge fixed point 'a' and the operational radii 'r' of second hinge fixed point 'b' and third hinge fixed point 'c' are different, thereby making a difference in tilting-up locus.

The difference in tilting-up locus is compensated by using a bush 16 for left and right tilt bolts 10, 11.

For this configuration, bush 16 has a flange seated on the edge of mounting boss 15a and a hollow circular portion inserted in a groove of mounting boss 15a, such that the entire shape of bush 16 is a T-shape.

Figure 4:
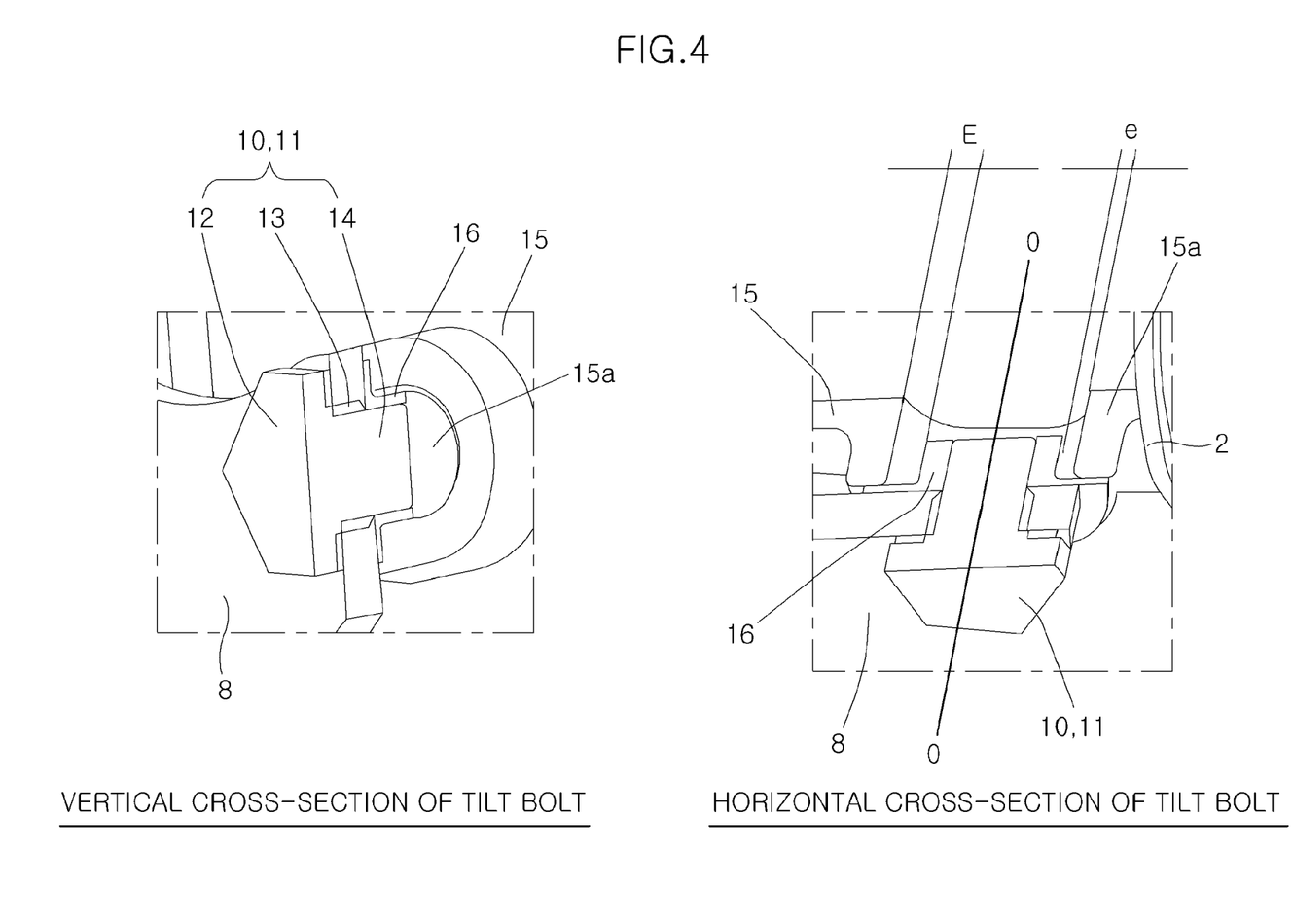

Referring to FIG. 4, since the groove of mounting boss 15a of tube housing 15 is an oblong shape, when the portion of bush 16 which is fitted on extender 14 of left and right bolts 10, 11 is inserted in the groove of mounting boss 15a, the left and right portions of mounting boss 15a make an empty space, which is a compensation space.

In the exemplary embodiment the right compensation gap 'e' which is the right empty space of mounting boss 15a from the center axis line 0-0 of left and right tilt bolts 10, 11 is smaller than the left compensation gap E that is the left empty space, which is for compensating the difference in tilting-up locus by allowing tube housing 15 to slide even in consideration of assembly errors.

Figure 5:
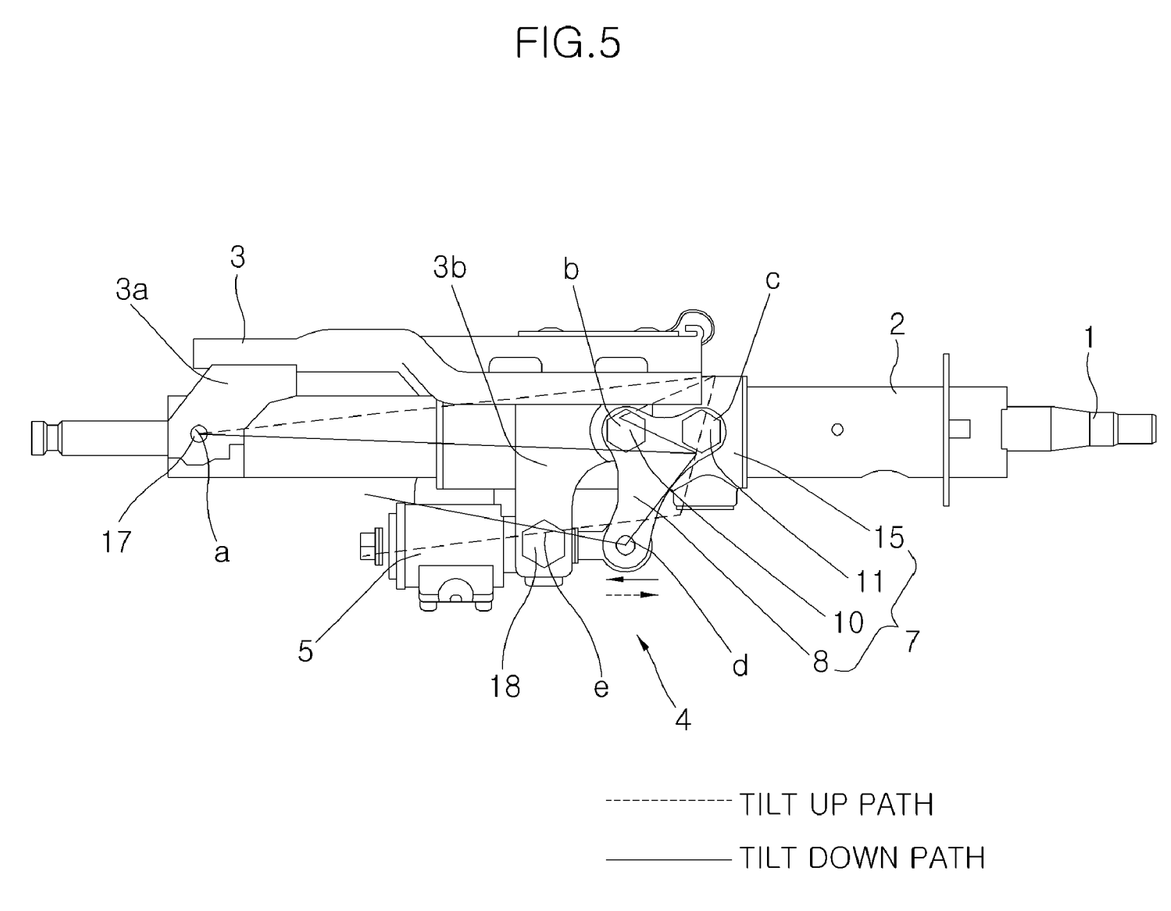
FIG. 5 is a view showing the tilt movement path of the tilt mechanism according to the present invention.

FIG. 5 is a view showing the tilt motion path of the tilt mechanism according to an exemplary embodiment of the present invention, in which the tilt motion path of tilt unit 4 that tilts up is indicated by a dotted line, while the tilt motion path of tilt unit 4 that tilts down is indicated by a solid line.

When tilt motor 5 is operated in tilting-up, tilt rod 6 moved out of tilt motor 5 by the operation of the worm shaft and the worm gear in tilt motor 5, and as tilt rod 6 is moved out, link bracket 8 moves upward while being pushed and rotated.

That is, link bracket 8 pushed by the pressing force of tilt rod 6 which is applied to fourth hinge fixed point 'd' moves upward while rotating counterclockwise about second hinge fixed point 'b' at third hinge fixed point 'c', and the force moving up link bracket 8 is transmitted to tube housing 15 combined with column tube 2 by left and right tilt bolts 10, 11.

Accordingly, column tube 2 moves upward and steering shaft 1 combined with column tube 2 moves up, thereby implementing tilting-up.

In tilting-up of steering wheel 1, first hinge fixed point 'a' positioned in the same line Ka-Ka as second hinge fixed point 'b' and third hinge fixed point 'c' and formed at column tube 2 functions as the fixed center point.

In tilting-up described above, second hinge fixed point 'b' that is the rotational reference point of third hinge fixed point 'c' also functions as the rotational reference point of fourth hinge fixed point 'd', such that force for bending upward is exerted in tilt rod 6 fixed to fourth hinge fixed point 'd'.

The bending-up of tilt rod 6 interferes with smooth tilting-up motion, but tilt motor 5 and tilt rod 6 make see-saw behavior in the opposite directions about fifth hinge fixed point 'e' connecting the housing of tilt motor 5 with mounting bracket 3, thereby removing the motion interfering with tilting-up.

When the force is not transmitted from tilt rod 6 to the worm shaft and the worm gear in tilt motor 5, gear matching between the worm shaft and the worm gear does not change, such that changes in noise due to tilting operation are not generated.

Further, since the operational radius R of third hinge fixed point 'c' rotating about first hinge fixed point 'a' and the operational radii 'r' of second hinge fixed point 'b' and third hinge fixed point 'c' are different, a difference in locus is generated in second hinge fixed point 'b' and third hinge fixed point 'c' in the tilting-up.

The difference in locus of second hinge fixed point 'b' and third hinge fixed point 'c' interferes with smooth tilting-up, but bush 16 is provided at second hinge fixed point 'b' and third hinge fixed point 'c' in the exemplary embodiment, thereby compensating the difference in locus.

Referring FIG. 4 showing the cross-section of third hinge fixed point 'c', bush 16 is assembled, with left compensation gap E and right compensation gap 'e' from the center axis line 0-0 of right tilt bolt 11 formed in the oblong groove of mounting boss 15a of tube housing 15, such that tube housing 15 can slide, using left compensation gap E and right compensation gap 'e' in tilting-up.

As tube housing 15 slides, the difference in locus that is necessarily generated by the difference operation radii R, 'r' of second hinge fixed point 'b' and third hinge fixed point 'c', such that the motion interfering with tilting-up can be removed in tilting-up.

In the exemplary embodiment, when right compensation gap 'e' is 1, the opposite left compensation gap 'E' becomes about 1.7.

Tilting-down for moving down steering shaft 1 is implemented by tilt motor 5 pulling tilt rod 6, which is the opposite to tilting-up.

That is, as tilt rod 6 is pulled by tilt motor 5 in tilting-down, link bracket 8 fixed to tilt rod 6 by fourth hinge fixed point 'd' is pulled and moved down while rotating clockwise.

The force moving down link bracket 8 is transmitted to tube housing 15 by left and right tilt bolts 10, 11 connected to second hinge fixed point 'b' and third hinge fixed point 'c', respectively, while the force moving down tube housing 15 can implement tilting-down by moving down steering shaft 1 together with column tube 2 combined with tube housing 15.

Force for bending down is also exerted in tilt rod 6 fixed to fourth hinge fixed point 'd' in tilting-down of steering shaft 1, as in tilting-up, and interferes with smooth tilting-down, but tilt motor 5 and tilt rod 6 make see-saw behavior in the opposite directions about fifth hinge fixed point 'e', thereby removing the motion interfering with tilting-up.

Further, since tube housing 15 compensates the difference in locus of second hinge fixed point 'b' and third hinge fixed point 'c' by sliding, it is also possible to remove the motion interfering with tilting-down, as in tilting-up.

Figure 6:
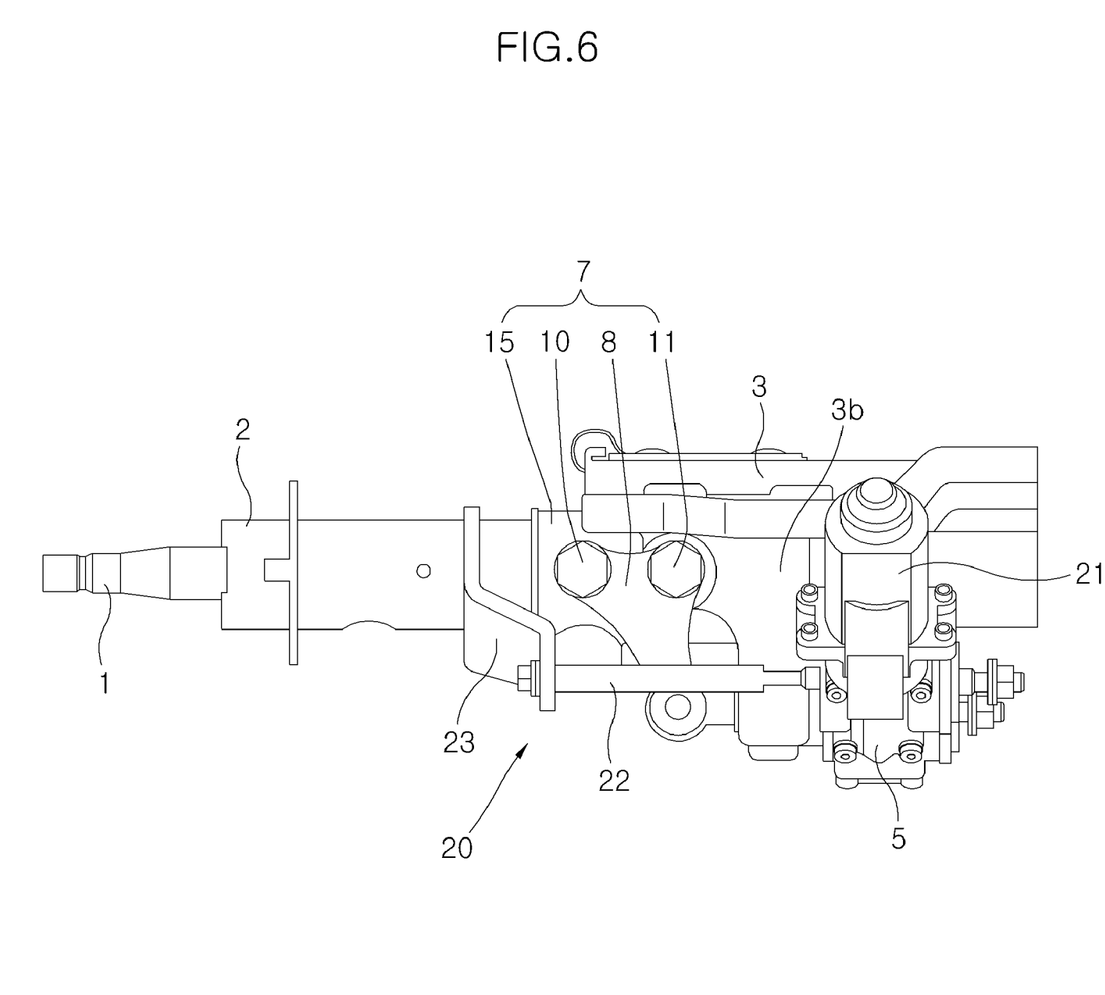
FIG. 6 is a view showing an exemplary configuration of a lower type motor-driven column apparatus equipped with a telescopic mechanism according to the present invention.

Referring to FIG. 6, telescopic unit 20 is composed of a telescopic motor or tele-motor 21 having built-in worm shaft and worm gear, a telescopic rod or tele-rod 22 moving straight forward/backward by the worm shaft and the worm gear of tele-motor 21, and a telescopic bracket or tele-bracket 23 fixed to tele-rod 22 and combined with column tube 2 to telescopically move column tube 2 forward/backward.

Tele-rod 22 is arranged in the axial direction of column tube 2, whereas tele-motor 21 is arranged perpendicular to tele-rod 22.

Figure 7:
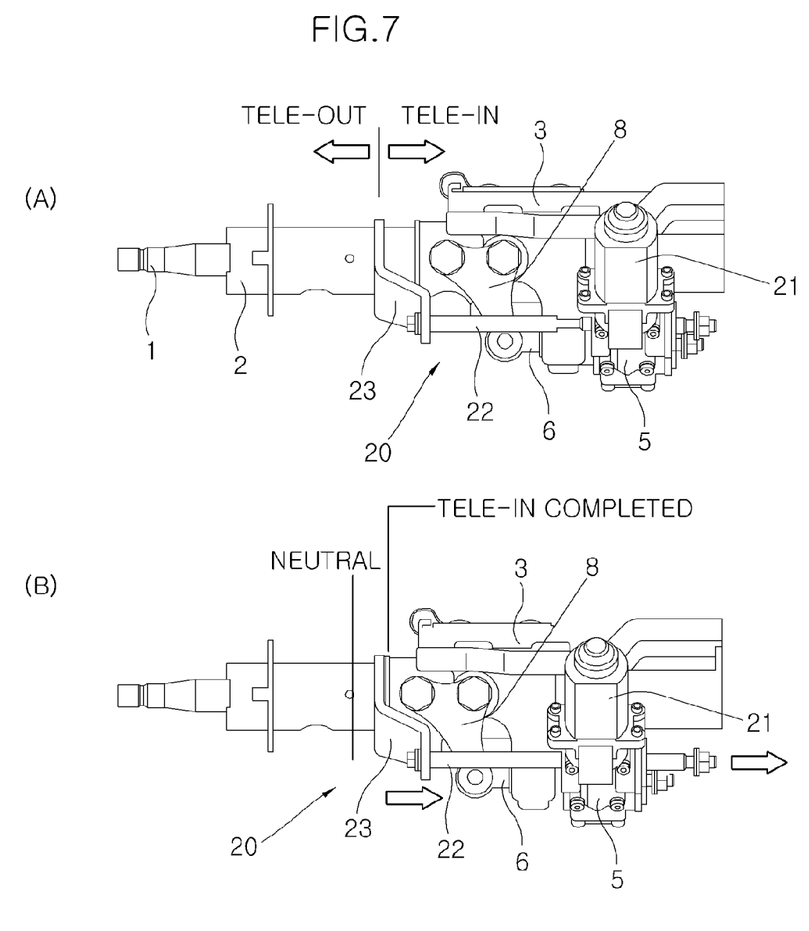
FIGS. 7A and 7B are views illustrating an exemplary telescopic operation of the lower type motor-driven column apparatus according to the present invention.

FIG. 7 is a view showing the telescopic operation according to an exemplary embodiment of the present invention, in which a tele-in operation at the neutral position shown in FIG. 7A results in that tele-rod 22 has been pulled (the steering wheel has moved away from the driver) while an tele-out operation results in that tele-rod 22 has been pushed (the steering wheel moves close to the driver).

FIG. 7B shows the tele-in operation, in which as tele-rod 22 is pulled by the worm shaft and the worm gear operated by tele-motor 21, tele-rod 22 pulls tele-bracket 23 fixed to the end of tele-rod 22 and column tube 2 fixed to tele-bracket 23 is moved toward tele-bracket 23, thereby completing the tele-in operation.

As described above, unlike the upper type simultaneously moving the tilt mechanism in telescopic movement, the telescopic mechanism is implemented individually from the tilt mechanism in the lower type, such that load applied to tele-motor 21 is reduced and operation noise can be reduced.

Figure 8:
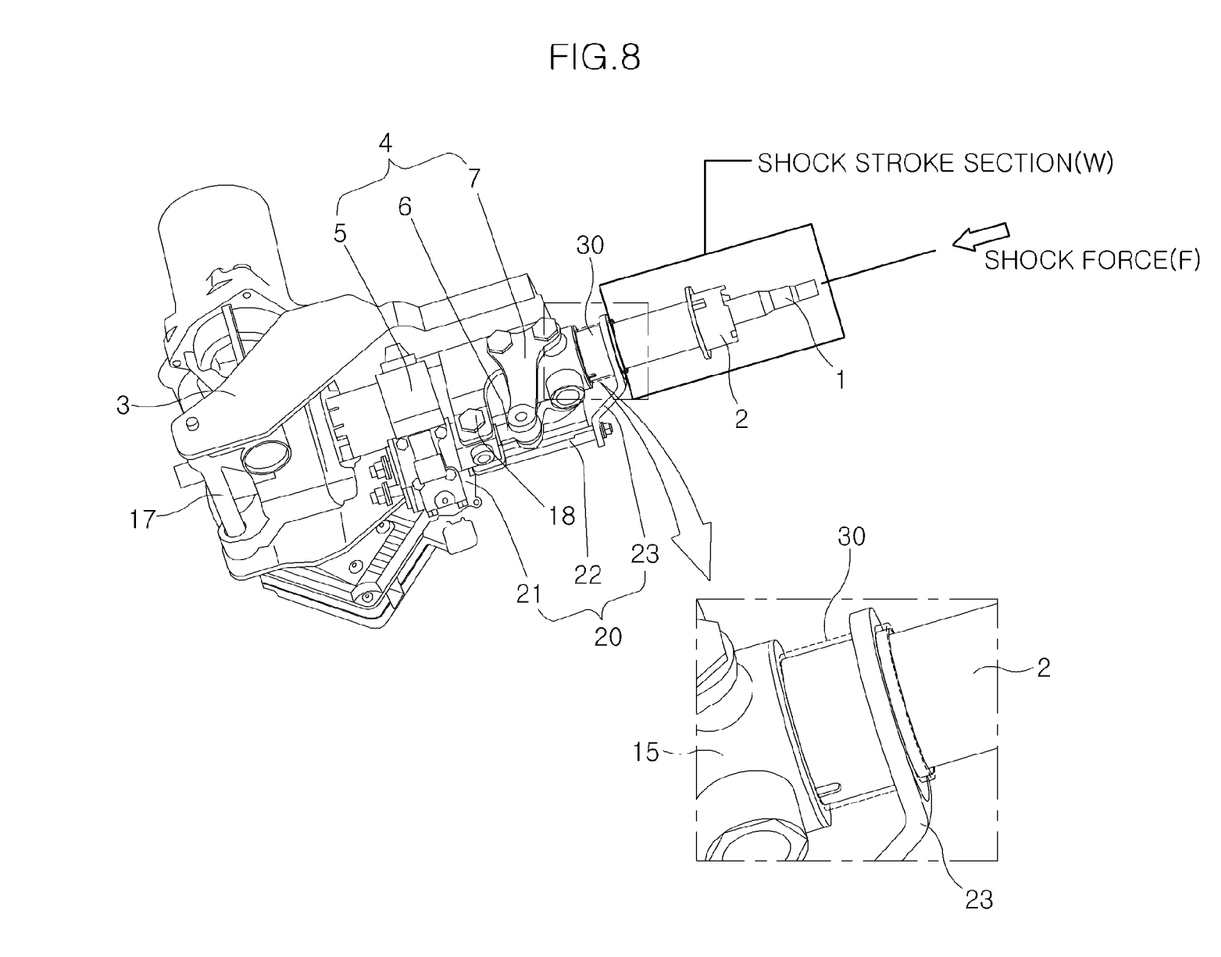
FIG. 8 is a view showing an exemplary configuration of absorbing shock of the lower type motor-driven column apparatus according to the present invention.

Referring to FIG. 8, the shock-absorbing structure is implemented by a shock-absorbing member 30 formed in a tube ring type to cover column tube 2 and shock-absorbing member 30 forms a friction material and a friction structure to generate strong friction force when being pushed by shock.

In the exemplary embodiment, shock-absorbing member 30 is positioned ahead of tilt unit 4 and telescopic unit 20, in detail, is combined with column tube 2 at the position inside where tele-bracket 23 of telescopic unit 20 is made tele-in.

Shock-absorbing member 30 stops column tube 2 pushed by shock force F transmitted through the steering wheel, using friction force, ahead of tilt unit 4 and telescopic unit 20, such that a shock stroke section W of column tube 2 pushed by the shock force F can be formed only ahead of shock-absorbing unit 30 without interfering with tilt unit 4 and telescopic unit 20.

As described above, in the lower type motor-driven column apparatus according to the exemplary embodiment of the present invention, since the operation mechanism of tilt unit 4 and the operation mechanism of telescopic unit 20 are individually implemented, the MDPS can be easily used for middle-sized and large-sized vehicles which are difficult to use the upper type, such that it is possible to save fuel of the middle-sized and large-sized vehicles.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lower type motor-driven column apparatus, comprising:
   a tilt unit hinged to a car body-fastening mounting bracket and mounted on a column tube covering a steering shaft to implement tilting up and down motion of the column tube;
   a telescopic unit mounted on the column tube without interference with the tilt unit and moveable independently of the tilt unit when implementing telescopic movement pushing or pulling the column tube; and
   a shock-absorbing member mounted on the column tube to prevent axial motion of the column tube using friction force and absorbing shock on the column tube;
   wherein the shock-absorbing member is formed in a tube ring type to cover the column tube.

2. The lower type motor-driven column apparatus as defined in claim 1, wherein the tilt unit includes:
   a tilt rod combined with a tilt motor hinged to the car body-fastening mounting bracket; and
   a tilt link which has a lower end connected to the tilt rod and an upper end hinged to the column tube to apply force to the column tube by means of straight motion of the tilt rod; and
   wherein the telescopic unit further includes:
   a tele-rod combined with a tele-motor; and
   a tele-bracket connected to the tele-rod moving straight to implement telescopic movement pulling or pushing the column tube.

3. The lower type motor-driven column apparatus as defined in claim 2, wherein a worm shaft and a worm gear, which convert rotation of the motor into straight motion, are disposed in the tilt motor and the tele-motor.

4. The lower type motor-driven column apparatus as defined in claim 3, wherein the tilt motor is disposed in line with the tilt rod, the tele-motor is disposed perpendicular to the tele-rod, and the tilt rod and the tele-rod are arranged in parallel with the axis of the column tube.

5. The lower type motor-driven column apparatus as defined in claim 2, wherein the lower end of the tilt link is connected with the tilt rod by one hinge connecting portion and the upper end of the tilt link is connected with the column tube by two hinge connecting portions positioned in the same line as hinge center points of the column tube and the mounting bracket.

6. The lower type motor-driven column apparatus as defined in claim 5, the two hinge connecting portions are higher than the mounting bracket rod.

7. The lower type motor-driven column apparatus as defined in claim 5, wherein the tilt link includes:
   a link bracket forming the lower end and the upper end;
   a tilt rod pin making the hinge connecting portion of the lower end;
   a pair of left and right tilt bolts making the hinge connecting portions of the upper end; and
   a tube housing combined with the left and right tilt bolts to form a gap for sliding, and sliding while covering the column tube.

8. The lower type motor-driven column apparatus as defined in claim 7, wherein a bush is provided where the left and right tilt bolts are combined with the column tube.

9. The lower type motor-driven column apparatus as defined in claim 7, wherein a mounting boss having an oblong groove forming empty spaces at the left and right sides from the center axis line of the left and right tilt bolts is formed in the tube housing.

10. The lower type motor-driven column apparatus as defined in claim 9, wherein the gap of the right empty space is smaller than the gap of the opposite left empty space.

11. The lower type motor-driven column apparatus as defined in claim 2, wherein the tele-bracket pulls or pushes the column tube, at a position out of the tilt link.

12. The lower type motor-driven column apparatus as defined in claim 1, wherein the shock-absorbing member is combined with the column tube inside where the tele-bracket is made tele-in.

* * * * *